Aug. 3, 1965  R. A. POWERS ETAL  3,198,998
ELECTROCHEMICAL DETECTOR AND ELECTROLYTE THEREFOR
Filed Feb. 19, 1960
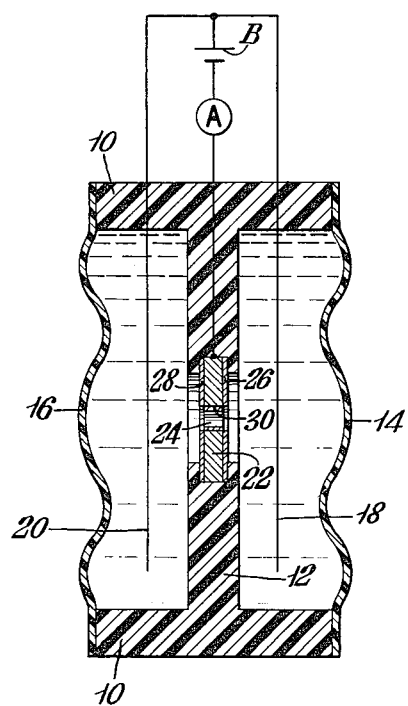
INVENTORS
ROBERT A. POWERS
DEMETRIOS V. LOUZOS
BY
ATTORNEY United States Patent Office 3,198,998
Patented Aug. 3, 1965

3,198,998
ELECTROCHEMICAL DETECTOR AND
ELECTROLYTE THEREFOR
Robert A. Powers, Lakewood, and Demetrios V. Louzos, Rocky River, Ohio, assignors to Union Carbide Corporation, a corporation of New York
Filed Feb. 19, 1960, Ser. No. 9,791
2 Claims. (Cl. 317—231)

This invention relates to electrochemical detectors, and more particularly relates to an electrolyte for improving the stability of such devices.

The basic principles of electrochemical detectors are described in a paper by Hurd and Lane, "Principles of Very Low Power Electrochemical Control Devices," "Journal of the Electrochemical Society," Volume 104 No. 12, December 1957. Electrochemical detectors convert signals such as acoustical pressure into electric current. One type of detector has the property that the electric current is a linear function of the volume flow rate of fluid through a detecting element. This device is known as a "Linear Detector." Still another type of detector has the property that the electric current is a logarithmic function and this device is known as a "Log Detector."

These detectors generally comprise a housing divided into two compartments, one wall of which compartment is a flexible diaphragm. Each of the compartments contains a solution of an electrolyte containing a reversible redox system, and in each compartment is an electrode, usually of platinum, inert to the solution therein. Typical of such reversible redox systems are solutions of iodine and an alkali metal iodide, for example, iodine-potassium iodide. Other suitable reversible redox systems are bromine-alkali metal bromide, ferricyanide-ferrocyanide, ceric-cerous, ferric-ferrous, and the like. Between the compartments is a partition having an aperture in which is mounted a detecting electrode. The detecting electrode has been made the cathode in a biasing circuit. It is usually a disc of platinum having a tiny orifice therein for the transmission of solution from one compartment to the other. The platinum disc has a layer of glass adhered to each of its sides such that the platinum detecting electrode is exposed only at the surface of the tiny orifice. Other types of detecting electrodes may also be employed; for example, the detecting electrode may be a small piece of platinum situated in an orifice of a glass disc. When the device is properly biased and an equilibrium attained, a measured species of the redox system slowly diffuses to the detecting cathode electrode where it undergoes electrochemical reaction. If a signal, such as an acoustical pressure, is provided on the flexible diaphragm defining one wall of either compartment, the solution in that compartment tends to flow through the orifice, thereby making a greater quantity of the measured species available for electrochemical reaction at the detecting cathode. Thus, in response to a pressure, an electric current is produced that can be measured.

Electrochemical detectors are required to display uniform current output characteristics over a relatively long period of time. These electrochemical detectors, however, have at times displayed unstable performance in that their pressure-current response values may change radically in as little as one or two days. The instability of electrochemical detectors is believed to be associated with the electrodeposition on the surface of the detecting cathode electrode in the tiny orifice of various trace metallic impurities present in the electrolyte, impurities such as tin, lead, silver, and copper being illustrative of only a few. These impurities are present in the electrolyte in very small amounts normally on the order of several parts per million. They may occur from any of several sources, such as from leaching of lead from the soft glass installation on the platinum cathode. The surface of the detecting electrode which is exposed at the orifice is quite small and extremely sensitive to any changes, even slight changes, in the geometry of the orifice. Thus, because these impurities tend to build-up irregular, high surface area deposits when electrodeposited on the detecting cathode electrode, the stability of an electrochemical detector may be seriously affected. Depending upon other factors, noticeable effects may occur after the first day of operation and thenceforth from one day to the next. Unfortunately, there are no practical methods known in the art for eliminating these minute impurities from the electrolyte or for preventing their electrodeposition on the detecting cathode. Ideally then, for optimum stability in the operation of an electrochemical detector, such devices call for the provision of a detecting cathode electrode, the surface of which within the tiny orifice thereof is smooth and of fixed geometric dimensions and which is virtually unaffected by the electrodeposition of trace impurities present in the electrolyte.

It is therefore an object of the invention to provide an electrochemical detector having such a detecting cathode electrode. Another object is to provide an electrolyte for an electrochemical detector which will improve its stability by electrodepositing a thin film of mercury on the surface of the detecting cathode electrode.

These objects are achieved by the invention which comprises an electrochemical detector having a detecting cathode electrode and an electrolyte therefor which has added thereto a small but effective amount of soluble mercury ions sufficient to electrodeposit a thin film of mercury on the surface of the detecting electrode, whereby impurities in the electrolyte electrodeposited on the surface of the detecting electrode are dissolved within the mercury film and irregular deposits of these impurities prohibited from forming thereon.

The invention will now be disclosed, for the sake of conciseness, by the following description of a log detector, having reference to the accompanying drawing which schematically shows a device embodying the invention.

Referring to the drawing, a log detector embodying the invention comprises a housing 10 divided into two compartments by an apertured partition 12, each of the compartments having as one wall thereof one of a pair of flexible diaphragms 14, 16. In each compartment are electrodes 18, 20 connected to a biasing battery B and constituting anodes for each compartment. The detecting cathode electrode 22 has an orifice 24 at its center and is positioned in the aperture of the partition 12. The detecting electrode 22 is composed of platinum and has a layer 26, 28 of soft glass adhered to each side. Both compartments of the log detector are filled with an electrolyte composed of a liquid solution containing a reversible redox system.

It is the essence of the invention that the stability of an electrochemical detector may be substantially improved by the provision of a thin film of mercury deposited on the surface of the detecting cathode electrode thereof. The mercury film, depicted at 30 covers the entire surface area of the platinum detecting electrode 22 exposed at the orifice 24. It is known that platinum is essentially insoluble in mercury and will not readily amalgamate, but that mercury has the characteristic or tendency to wet platinum. Thus, it has been found according to the invention that a thin film of mercury 30 may be deposited on the exposed surface of the detecting cathode electrode 22 in the orifice 24 by electrodepositing on the detecting electrode an effective amount of mercury which has been added to the electrolyte. The mercury film 30 may also be deposited on the detecting electrode 22 by initially wetting the surface of the electrode. In either instance, the mercury film 30 may be maintained on the detecting electrode throughout the operation of the log detector during the time that the detecting electrode is maintained on cathodic bias. When the detector is off-bias, if the chemical nature of the electrolyte permits, the mercury film may dissolve in the electrolyte. When properly biased again, the mercury is electrodeposited on the surface of the detecting cathode electrode, and so on throughout the operation of the detector.

The trace metallic impurities present in the electrolyte, such as tin, lead, and copper, for the most part, are soluble in mercury. These trace impurities then readily dissolve within the mercury film when they are disposed on the surface of the detecting electrode 22 at the orifice 24 during any biasing period. Consequently, high surface area deposits which heretofore occurred when these impurities were electrodeposited on the detecting electrode are circumvented and it will be readily apparent that the stability of the log detector may be thereby substantially improved. The mercury film of the invention further enhances the stability of the detector by the provision of a smooth, clean surface over the entire surface area of the detecting electrode. This film surface will remain of substantially fixed geometric proportions throughout operation of the detector. It is to be noted that the use of the term "amalgam" for describing the mercury film of the invention has been avoided herein since the term generally connotes the addition to mercury of substantial rather than minute amounts of a soluble metal or metallic impurity.

In the practice of the invention, the mercury film 30 may be deposited on the surface of the detecting cathode electrode 22 by initially wetting the surface of the orifice 24 with mercury prior to or during assembly of the detector or by adding an effective amount of mercury to the electrolyte in the form of a soluble salt and then electrodepositing mercury on the surface of the detecting electrode 22. The amount of mercury to be used is generally not critical, it being sufficient if there is enough mercury available to cover the entire exposed surface area of the detecting cathode electrode 22 within the orifice 24 and to provide a smooth, clean surface of mercury thereon. However, excessive amounts of mercury over that necessary to cover the surface of the detecting electrode are not desirable since the orifice is quite small, being on the order of about 0.01 inch in diameter. It has been found that the addition into the electrolyte of as little as 2 parts per million of soluble mercury ions will produce a noticeable improvement in the stability of a log detector after several days of operation. With the addition of a greater concentration of soluble mercury ions, say about 10 parts per million, a more immediate improvement in the stability of the detector will be observed. Although it is to be understood as in no way limiting the invention and that higher concentrations of mercury may be successfully employed if excessive amounts of mercury are avoided, a concentration in the electrolyte of about 22 parts per million of the soluble mercury ions is probably as high as would be needed in the best practice of the invention. Preferably, a concentration of soluble mercury ions within the range of from about 5 to 15 parts per million should be used.

Electrolytes thus far employed with electrochemical detectors known in the art contain a reversible redox system. The electrolyte is prepared by employing a solvent, such as water, one of the functions of which is to dissolve the measured species of the redox system. It is important that the mercury salt used in the practice of the invention be one that will not precipitate or otherwise destroy the measured species of the redox system. Among the mercury salts that are suitable in the practice of the invention, mercuric chloride, mercuric bromide, mercuric iodide, and mercuric acetate are illustrative.

In one example of the invention, soluble mercury ions in the form of mercuric iodide were added to the iodine electrolyte of a long detector which had shown a rising current versus log pressure response due to deposits of impurities present in the electrolyte on the detecting cathode electrode. The concentration of the mercuric iodide in the electrolyte was 22 parts per million of soluble mercury ions. The detector showed an immediate improvement in its stability by the return of the current versus log pressure response to its original value.

It is to be understood that although the invention was described herein with particular reference to a log detector, the invention may be as well applied to other electrochemical detectors known in the art. Thus, it may be mentioned that the invention is admirably suited to the operation of a linear electrochemical detector.

What is claimed is:

1. An electrochemical detector comprising a housing; a partition within the housing dividing the housing into a pair of compartments and provided with an aperture communicating the compartments; a flexible diaphragm within a wall of each of the compartments; a platinum detecting cathode electrode situated within the aperture of the partition; an anode electrode in each of the compartments and electrically connected to the detecting cathode electrode; and an electrolyte substantially filling both compartments and which is a solution of a reversible redox system selected from the group consisting of bromine-alkali metal bromide, iodine-alkali metal iodide, ferricyanide-ferrocyanide, ceric-cerous, and ferric-ferrous, in combination with from about 2 to about 22 parts per million of a mercury ion.

2. The electrochemical detector defined in claim 1 wherein a portion of the mercury ion is deposited as a thin film of mercury on the electrode surface.

References Cited by the Examiner
UNITED STATES PATENTS

| 1,349,999 | 8/20 | Blake | 204—45 |
| 2,896,095 | 7/59 | Reed. | |
| 2,910,648 | 10/59 | Keller | 217—231 |

OTHER REFERENCES

Neumann: "Electrolytic Methods of Analysis" 1898), 138–140.

DAVID J. GALVIN, *Primary Examiner.*

MILTON O. HIRSHFIELD, JAMES D. KALLAM,
*Examiners.*